United States Patent
Yamamoto et al.

(10) Patent No.: US 12,105,603 B2
(45) Date of Patent: Oct. 1, 2024

(54) DISTRIBUTED TRANSACTION CONTROL SYSTEM AND DISTRIBUTED TRANSACTION CONTROL METHOD

(71) Applicant: Hitachi, Ltd., Tokyo (JP)

(72) Inventors: Nobuyuki Yamamoto, Tokyo (JP); Naoshi Maniwa, Tokyo (JP); Junpei Nishitani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 211 days.

(21) Appl. No.: 17/950,589

(22) Filed: Sep. 22, 2022

(65) Prior Publication Data

US 2023/0315754 A1  Oct. 5, 2023

(30) Foreign Application Priority Data

Mar. 30, 2022 (JP) .................. 2022-055670

(51) Int. Cl.
| | | |
|---|---|---|
| *G06F 15/16* | (2006.01) | |
| *G06F 9/46* | (2006.01) | |
| *G06F 11/18* | (2006.01) | |
| *G06F 16/27* | (2019.01) | |
| *H04L 67/54* | (2022.01) | |

(52) U.S. Cl.
CPC .............. *G06F 11/18* (2013.01); *G06F 9/466* (2013.01); *G06F 16/273* (2019.01); *H04L 67/54* (2022.05)

(58) Field of Classification Search
CPC ........ G06F 9/466; G06F 11/18; G06F 16/273; H04L 67/54
USPC ....................................................... 709/219
See application file for complete search history.

(56) References Cited

U.S. PATENT DOCUMENTS

| | | | | |
|---|---|---|---|---|
| 7,725,446 B2 * | 5/2010 | Huras | ..................... | G06F 9/466 |
| | | | | 709/200 |
| 8,271,448 B2 * | 9/2012 | Parkinson | ............... | G06F 9/466 |
| | | | | 707/610 |
| 9,159,050 B2 * | 10/2015 | Garza | ..................... | G06Q 10/10 |
| 9,773,237 B2 * | 9/2017 | Ananda kumar | ...... | G06Q 20/10 |
| 9,892,152 B2 * | 2/2018 | Mitchell | ............. | G06F 16/2365 |

(Continued)

OTHER PUBLICATIONS

F. Goncalves Pereira, Jean-Pierre Le Narzul, "Generating Fast Atomic Commit from Hyperfast Consensus," Springer-Verlag Berlin, Heidelberg, Conference: Salvador Brazil Oct. 25-28, 2005, 19 pgs.

(Continued)

*Primary Examiner* — Moustafa M Meky
(74) *Attorney, Agent, or Firm* — Volpe Koenig (57) ABSTRACT

A distributed transaction control system includes redundant coordinator apparatuses, wherein determination part replaces input votes to votes of preparation failure when input votes from the participant apparatus time out, makes a determination of commit when all input votes are votes of preparation success, makes a determination of rollback when the input votes include at least one vote of preparation failure, and inputs a content of the determination into the distributed consensus processing part, the distributed consensus processing part decides on one of the contents of the determination that are inputs from the determination parts, by distributed consensus, and settlement part notifies an output of the distributed consensus processing part to the participant apparatuses as a settlement result.

14 Claims, 12 Drawing Sheets

(56) References Cited

U.S. PATENT DOCUMENTS

| | | | | |
|---|---|---|---|---|
| 10,108,632 B2* | 10/2018 | Kanthak | ............... | G06F 16/182 |
| 11,314,544 B2* | 4/2022 | Little | ...................... | G06F 11/14 |
| 2006/0174224 A1* | 8/2006 | Parkinson | ............... | G06F 9/466 |
| | | | | 717/120 |
| 2009/0043845 A1* | 2/2009 | Garza | ................... | G06Q 10/10 |
| | | | | 709/204 |
| 2015/0149344 A1* | 5/2015 | Ananda kumar | ...... | G06Q 20/14 |
| | | | | 705/39 |
| 2015/0149350 A1* | 5/2015 | Ananda Kumar | ..... | G06Q 20/14 |
| | | | | 705/40 |
| 2017/0316026 A1* | 11/2017 | Kanthak | ............... | G06F 16/182 |
| 2022/0337436 A1* | 10/2022 | Beaudet | .............. | G06F 9/45558 |

OTHER PUBLICATIONS

Jim Gray, Leslie Lamport, "Consensus on Transaction Commit," Microsoft Research Jan. 1, 2004 revised Apr. 19, 2004, Sep. 8, 2005, Jul. 5, 2017 MSR-TR-2003-96, 35 pgs.

\* cited by examiner

PARTICIPANT LIST TABLE

| PARTICIPANT LIST | CHILD DETERMINATION STATE | CHILD PARTICIPANT |
|---|---|---|
| STARTER | DETERMINED | PARTICIPANT 1<br>PARTICIPANT 3 |
| PARTICIPANT 1 | DETERMINED | PARTICIPANT 2 |
| PARTICIPANT 2 | DETERMINED | NONE |
| PARTICIPANT 3 | DETERMINED | PARTICIPANT 4 |
| PARTICIPANT 4 | DETERMINED | NONE |

| LIST STATE |
|---|
| COMPLETE |

DISTRIBUTED TRANSACTION CONTROL SYSTEM AND DISTRIBUTED TRANSACTION CONTROL METHOD

CROSS-REFERENCE TO RELATED APPLICATION

This application claims priority pursuant to Japanese patent application No. 2022-055670, filed on Mar. 30, 2022, the entire disclosure of which is incorporated herein by reference.

TECHNICAL FIELD

Background

The present disclosure relates to a distributed transaction control system and a distributed transaction control method.

Related Art

A micro service architecture is starting to be adopted and weak-consistency Saga is proposed as means of distributed transaction. However, securing of consistency is a problem. Meanwhile, in an enterprise system, strong consistency is required and various technical developments and the like are in progress to solve problems in a strong-consistency distributed transaction technique.

For example, as techniques for solving a problem of single point of failure in two-phase commit, there are techniques described in "Generating Fast Atomic Commit from Hyperfast Consensus", F. Goncalves Pereira, Jean-Pierre Le Narzul, Springer-Verlag Berlin, Heidelberg, Conference: Salvador Brazil Oct. 25-28, 2005 and "Consensus on Transaction Commit", Microsoft Research 1 Jan. 2004 revised 19 Apr. 2004, 8 Sep. 2005, 5 Jul. 2017 MSR-TR-2003-96. In the techniques described in these literatures, the problem of single point of failure is attempted to be solved by making the transaction coordinator redundant by distributed consensus.

Although a two-phase commit technique based on XA is widely used in distributed transaction, this technique has such problems that a transaction coordinator is a single point of failure and communication delay causes heuristic inconsistency and stagnation in business operations.

Moreover, since the two-phase commit is performed along a distributed application invoking topology, the two-phase commit technique also has such problems that a branch portion is a single point of failure and an increase in communication time increases a DB lock period and hinders concurrency.

As described as an example in the related art, there is a method of solving the problem of the transaction coordinator being a single point of failure by using distributed consensus. However, the method disclosed in the related art is only for a commit process portion of the transaction and has no compatibility with XA and handling of topology.

SUMMARY

Accordingly, an object of the present disclosure is to provide a technique that can appropriately suppress inconsistency and stagnation in business operations caused by two-phase commit.

A distributed transaction control system of the present disclosure to solve the above object comprising redundant coordinator apparatuses that each includes: a determination part configured to wait for input votes from participant apparatuses and perform determination in settlement of a transaction; a distributed consensus processing part configured to make a decision on a determination result of the determination part; and a settlement part configured to decide whether to commit or rollback the transaction based on a result of the decision, wherein the determination part replaces the input votes to votes of preparation failure when the input votes time out, makes a determination of commit when all input votes are votes of preparation success, makes a determination of rollback when the input votes include at least one vote of preparation failure, and inputs a content of the determination into the distributed consensus processing part, the distributed consensus processing part decides on one of the contents of the determination that are inputs from a plurality of the determination parts, by distributed consensus, and the settlement part notifies an output of the distributed consensus processing part to the participant apparatuses as a settlement result.

Further, a distributed transaction control method of the present disclosure implemented by a system including redundant coordinator apparatuses that each includes a determination part configured to wait for input votes from participant apparatuses and perform determination in settlement of a transaction, a distributed consensus processing part configured to make a decision on a determination result of the determination part, and a settlement part configured to decide whether to commit or rollback the transaction based on a result of the decision, the method comprising: in each of the coordinator apparatuses, replacing the input votes to votes of preparation failure with the determination part when the input votes time out, making a determination of commit when all input votes are votes of preparation success, making a determination of rollback when at least one of the input votes is the vote of preparation failure, and inputting a content of the determination into the distributed consensus processing part; deciding with the distributed consensus processing part on one of the contents of the determination that are inputs from a plurality of the determination parts, by distributed consensus; and notifying with the settlement part the output of the distributed consensus processing part to the participant apparatuses as a settlement result.

The present disclosure can appropriately suppress inconsistency and stagnation in business operations caused by two-phase commit.

DETAILED DESCRIPTION OF EMBODIMENTS

<System Configuration>

Figure 1:
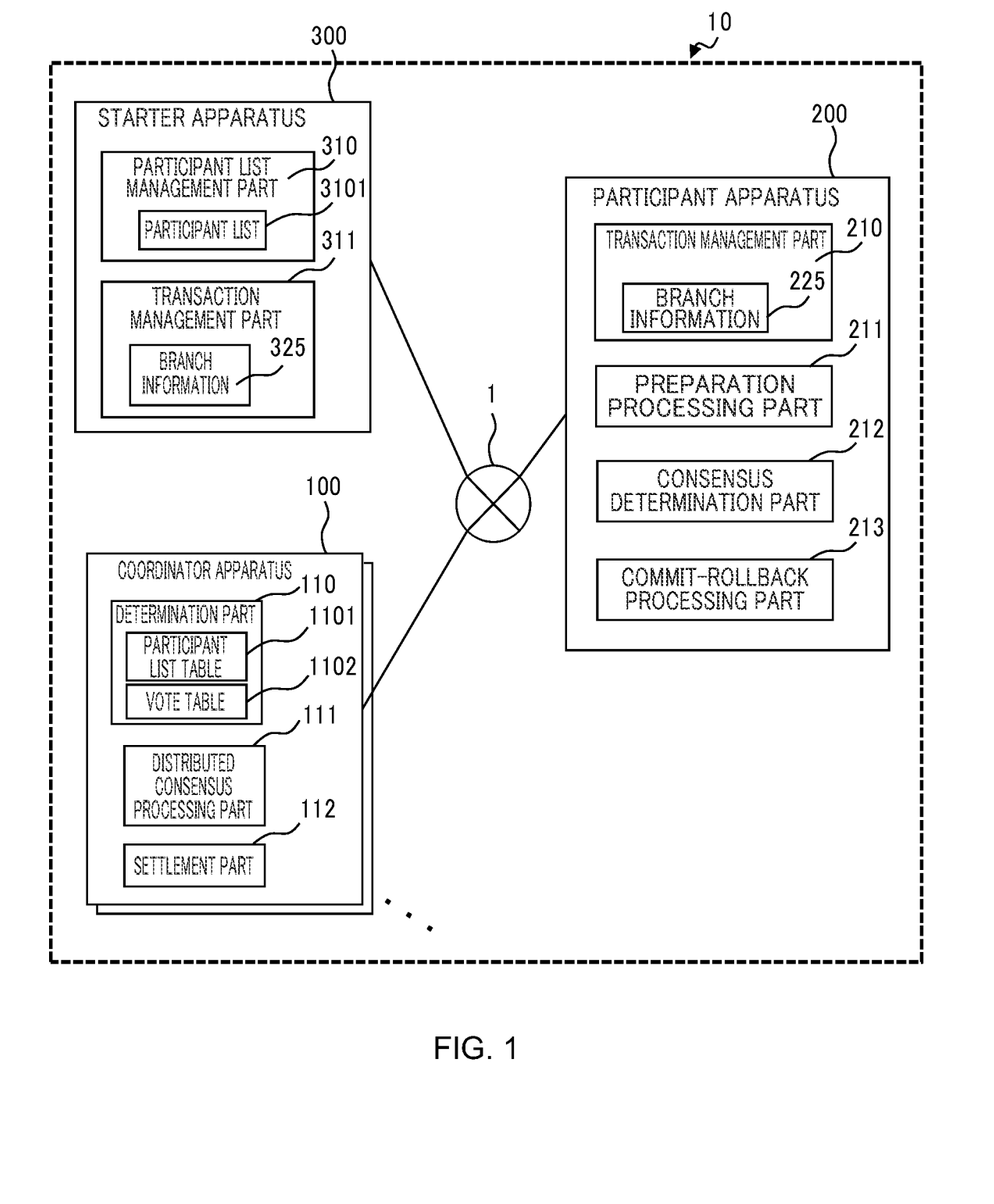
FIG. 1 is a diagram illustrating a configuration example of a distributed transaction control system of an embodiment.

An embodiment of the present disclosure is described below in detail by using the drawings. FIG. 1 is a network configuration diagram including a distributed transaction control system 10 of the present embodiment. The distributed transaction control system 10 illustrated in FIG. 1 is a computer system that can appropriately suppress inconsistency and stagnation in business operations caused by two-phase commit.

As illustrated in FIG. 1, in the distributed transaction control system 10 of the present embodiment, coordinator apparatuses 100, participant apparatuses 200, a starter apparatus 300, and the like are configured to be communicably coupled to one another via a network 1.

Among these, the coordinator apparatuses 100 are each an information processing apparatus mainly included in the distributed transaction control system 10 of the present embodiment and includes functions of a determination part 110, a distributed consensus processing part 111, and a settlement part 112.

Moreover, the determination part 110 holds and manages a participant list table 1101 based on a participant list obtained from the starter apparatus 300 and a vote table 1102 in which input votes from the participant apparatuses 200 are aggregated.

Note that the coordinator apparatuses 100 are assumed to be made redundant and multiple coordinator apparatuses 100 are assumed to be arranged in the distributed transaction control system 10 of the present embodiment.

Moreover, the participant apparatuses 200 each include functions of a transaction management part 210, a preparation processing part 211, a consensus determination part 212, and a commit-rollback processing part 213. Among these, the transaction management part 210 holds and manages branch information 225.

Figure 3:
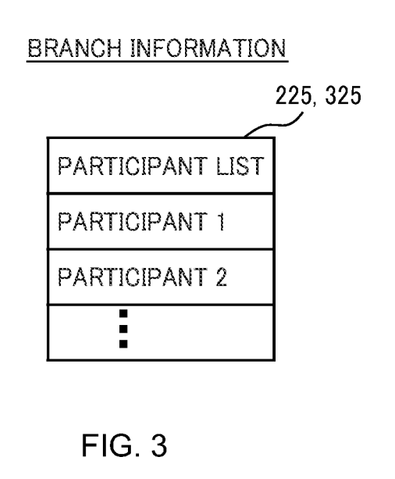
FIG. 3 is a diagram illustrating a configuration example of branch information in the embodiment.

The branch information 225 is information on a topology of distributed application invoking for performing two-phase commit (see FIG. 3). The transaction management part 210 is also referred to as so-called transaction manager and is an entity that prepares branches of each transaction by using an XA resource instance and causes the branches to cooperate to appropriately commit or rollback all branches. A transaction management part 311 of the starter apparatus 300 also has such functions of the transaction management part 210.

Meanwhile, the starter apparatus 300 has functions of a participant list management part 310 and the transaction management part 311. Among these, the participant list management part 310 corresponds to information on participants that share processes of a transaction issued by this starter apparatus 300. Moreover, the transaction management part 311 has branch information 325. The branch information 325 is the information on the topology of distributed application invoking for performing two-phase commit (see FIG. 3).

<Hardware Configuration>

Figure 2:
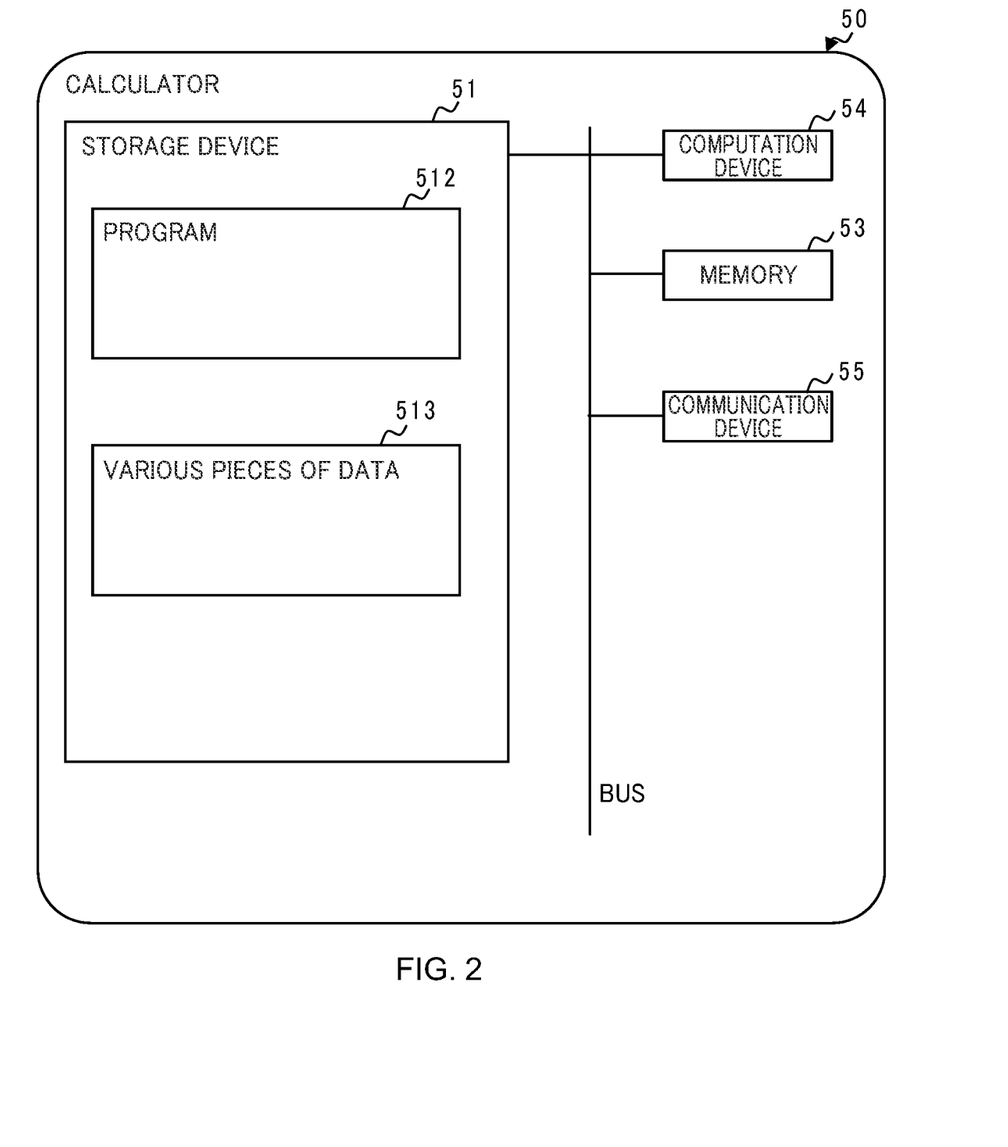
FIG. 2 is a diagram illustrating a hardware configuration example of a calculator in the embodiment.

FIG. 2 illustrates a hardware configuration example of the apparatuses included in the distributed transaction control system 10 of the present embodiment. Intended apparatuses are the coordinator apparatuses 100, the participant apparatuses 200, and the starter apparatus 300.

As illustrated as an example in FIG. 2, each of the apparatuses included in the distributed transaction control system 10, that is a calculator 50 includes a storage device 51, a memory 53, a computation device 54, and a communication device 55.

Among these, the storage device 51 is formed of an appropriate non-volatile storage element such as a solid state drive (SSD) or a hard disk drive.

Moreover, the memory 53 is formed of a volatile storage element such as a RAM.

Furthermore, the computation device 54 is a CPU that executes a program 512 held in the storage device 51 by loading the program 512 onto the memory 53 or by performing similar operations to perform integrated control of the apparatus as well as various determination, computation, and control processes.

Moreover, the communication device 55 is assumed to be a network interface card or the like that is coupled to the network 1 and that is responsible for communication processes with other apparatuses.

Note that the calculator 50 preferably further includes an input device that receives key inputs and audio inputs from an end user and an output device such as a display that displays processing data.

Moreover, at least various pieces of data 513 are stored in the storage device 51 in addition to the program 512 for implementing functions necessary for the calculator 50 included in the distributed transaction control system 10 of the present embodiment.

<Processes and Concepts to be Premises>

In this section, basic concepts and processes of distributed transaction control in the present embodiment are described. As described above, although a two-phase commit technique based on XA is widely used in the distributed transaction, this technique has such problems that the transaction coordinator is a single point of failure and communication delay causes heuristic inconsistency and stagnation in business operations.

Moreover, since the two-phase commit is performed along a distributed application invoking topology, the two-phase commit technique also has such problems that a branch portion is a single point of failure and an increase in communication time increases a DB lock period and hinders concurrency. As described as an example in the related art, there is a method of solving the problem of the transaction coordinator being a single point of failure by using distributed consensus. However, the method disclosed in the related art is only for a commit process portion of the transaction and has no compatibility with XA and handling of topology.

Accordingly, in the present disclosure, the following configuration is employed to enable appropriate suppression of inconsistency and stagnation in business operations caused by two-phase commit. Specifically, first, the configuration is such that the coordinator apparatuses 100 of a transaction are made to be redundant by using distributed consensus to remove the single point of failure (see FIG. 1).

Moreover, the topology of the commit process is flattened to remove problems of communication delay and the single point of failure caused by branches of the transaction. This flattening requires accumulation of a preparation voter list that is a participant list of the transaction. Accordingly, in the present embodiment, the participant list is determined by using the branch information 325 (see FIG. 3) of XA held by the starter apparatus 300 that is an application invoker. Branch registering communication from the participant side that occurs in the related art (Literature of Paxos Commit) is thereby suppressed. Moreover, when the application invoking has multiple stages, the branch information 225 that is topology information is sent from an intermediate stage (corresponding to the participant apparatuses 200) to the coordinator apparatuses 100 as a subtree to reconfigure all participants in the determination part 110.

Under these premises, the starter apparatus 300 of the transaction generates the participant list by using the branch information 325 of XA and distributes the participant list to the coordinator apparatuses 100.

Moreover, the participant apparatuses 200 each executes preparation for branches of the transaction (or a preparation request is distributed from the starter apparatus 300 to each participant apparatuses 200). Each participant apparatus 200 transmits success or failure of preparation to each of the redundant coordinator apparatuses 100.

The determination part 110 of each coordinator apparatus 100 waits for distribution of the participant list obtained from the starter apparatus 300 and the success or failure of preparation obtained from each participant apparatus 200 in actual-time timeout and determines a settlement result. In this determination, the determination part 110 determines that the settlement result is commit if the results of preparation obtained from the respective participant apparatuses 200 are all success, and determines that the settlement result is rollback without waiting any further if there is even one result of failure.

Moreover, the determination part 110 of each coordinator apparatus 100 determines the settlement result by using the distributed consensus and sends the settlement result to the participant apparatuses 200. Meanwhile, the participant apparatuses 200 perform commit or rollback according to the settlement result.

<Flow Example: Determination Part of Coordinator Apparatus>

Actual steps of a distributed transaction control method in the present embodiment are described below based on the drawings. Various operations corresponding to the distributed transaction control method described below are implemented by programs loaded onto the memories and executed by the apparatuses included in the distributed transaction control system 10. These programs are formed of codes for performing the various operations to be described below.

Figure 4A:
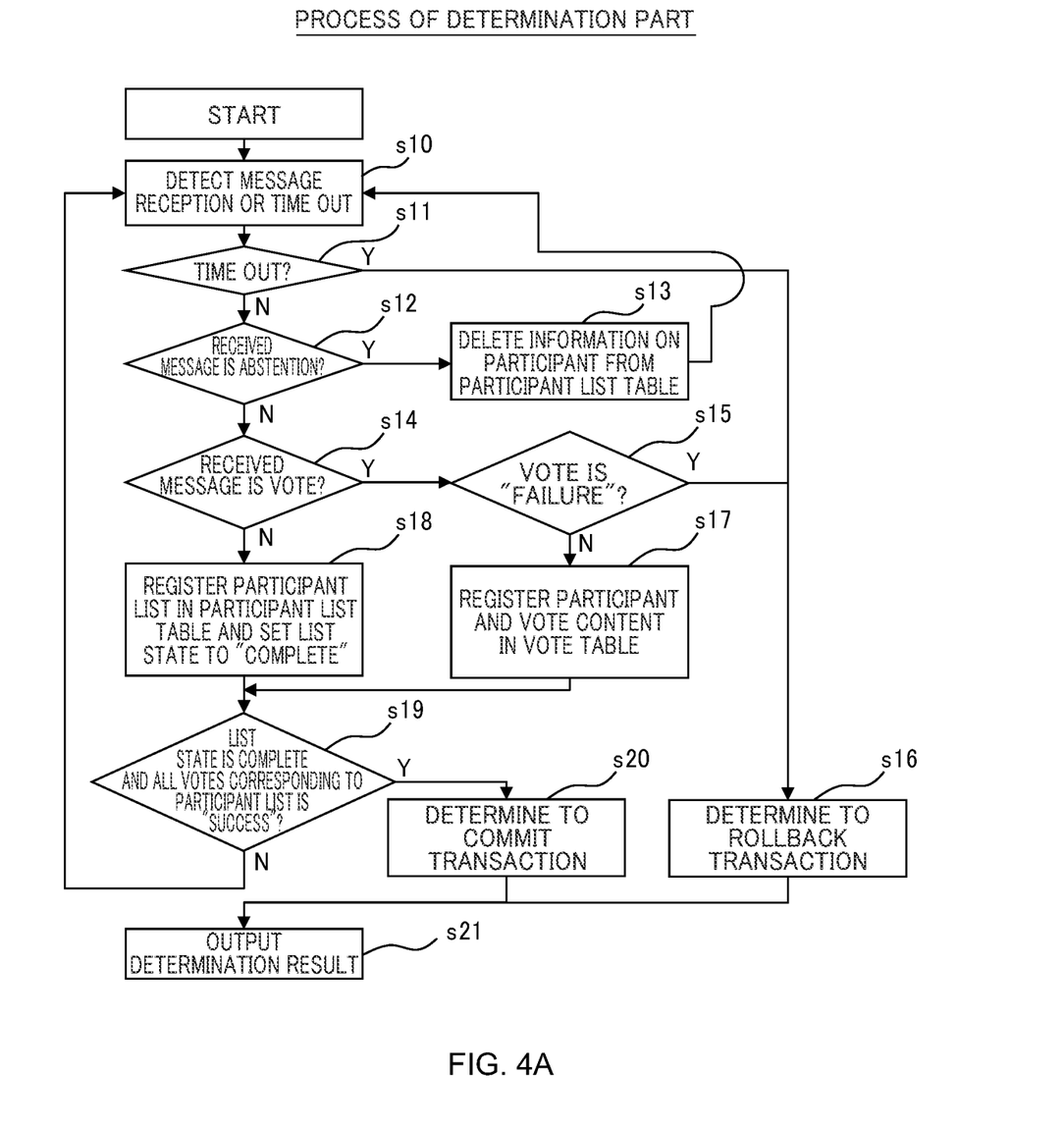
FIG. 4A is a diagram illustrating a processing flow example of a determination part in a distributed transaction control method of the embodiment.

FIG. 4A is a diagram illustrating a flow example of the distributed transaction control method in the present embodiment. Specifically, FIG. 4A illustrates a processing flow example in the determination part 110 of each coordinator apparatus 100.

In this case, the determination part 110 of each coordinator apparatus 100 detects time out or reception of the success or failure of preparation, that is the input vote from the participant apparatus 200 (s10). The length of time to this time out is specified in advance by those who have knowledge.

When the time out is detected in s10 described above (s11: Y), the determination part 110 of each coordinator apparatus 100 transitions the process to s16, determines that this transaction is to be rolled back, and outputs this result to the distributed consensus processing part 111 (s21).

Meanwhile, when the time out is not detected in s10 described above (s11: N), the determination part 110 of each coordinator apparatus 100 determines whether a message received from each participant apparatus 200 is a message indicating abstention of an input vote (s12).

When the result of the aforementioned determination is such that the received message is a message indicating "abstention" (s12: Y), the determination part 110 of each coordinator apparatus 100 deletes information on the corresponding participant from the participant list table 1101 (see FIG. 4B) (s13) and returns the process to s10.

Meanwhile, when the result of the aforementioned determination is such that the received message is not a message indicating "abstention" (s12: N), the determination part 110 of each coordinator apparatus 100 determines whether the received message is an input vote or not (s14).

When the result of this determination is such that the received message is an input vote (s14: Y) and the input vote is a vote indicating "failure" (s15: Y), the determination part 110 of each coordinator apparatus 100 transitions the process to s16, determines that this transaction is to be rolled back, and outputs this result to the distributed consensus processing part 111 as described above (s21).

Meanwhile, when the result of the aforementioned determination is such that the input vote is not a vote indicating "failure" (s15: N), the determination part 110 of each coordinator apparatus 100 registers the information on the participant and the content of the input vote in the vote table 1102 (see FIG. 4C) and transitions the process to s19.

Meanwhile, when the result of the determination in s14 is such that the received message is not an input vote (s14: N), the determination part 110 of each coordinator apparatus 100 transitions the process to s18, registers the participant list in the participant list table 1101, and set the list state of this participant to "complete" (see FIGS. 4B and 4C).

Figure 4B:
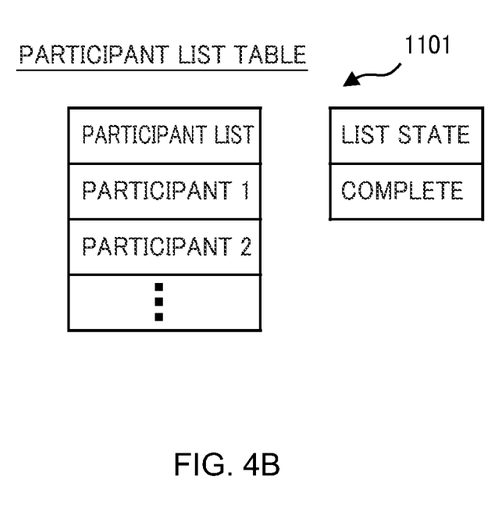
FIG. 4B is a diagram illustrating a configuration example of a participant list table in the embodiment.
Figure 4C:
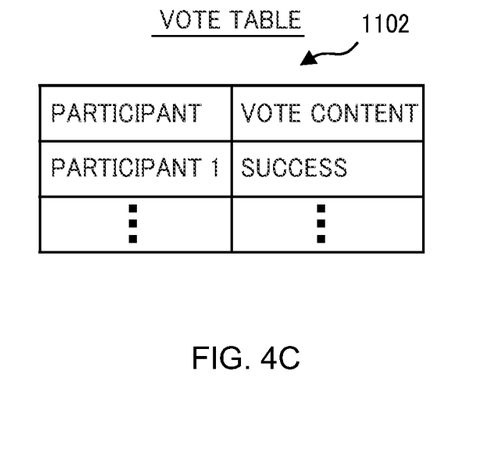
FIG. 4C is a diagram illustrating a configuration example of a vote table in the embodiment.

Next, the determination part 110 of each coordinator apparatus 100 determines whether the list state is complete and the input votes corresponding to the participant list table 1101 are all "success" (s19).

When the result of this determination is such that the list state is complete and the input votes are not all in the state of "success" (s19: N), the determination part 110 of each coordinator apparatus 100 returns the process to s10.

Meanwhile, when the result of the aforementioned determination is such that the list state is complete and the input votes are all "success" (s19: Y), the determination part 110 of each coordinator apparatus 100 determines that this transaction is to be committed (s20) and outputs this result to the distributed consensus processing part 111 (s21).

As described above, in the present embodiment, in order to solve the problems of tree-shaped two-phase commit along a topology while supporting dynamic application invoking topology, the commit process does not have a tree shape and is performed by the coordinator apparatuses 100 of the transaction. To achieve this, each coordinator apparatus 100 receives and uses the participant list as input information.

<Flow Example: Determination Part of Coordinator Apparatus in Case of Dynamic Application Invoking Topology>

Figure 5A:
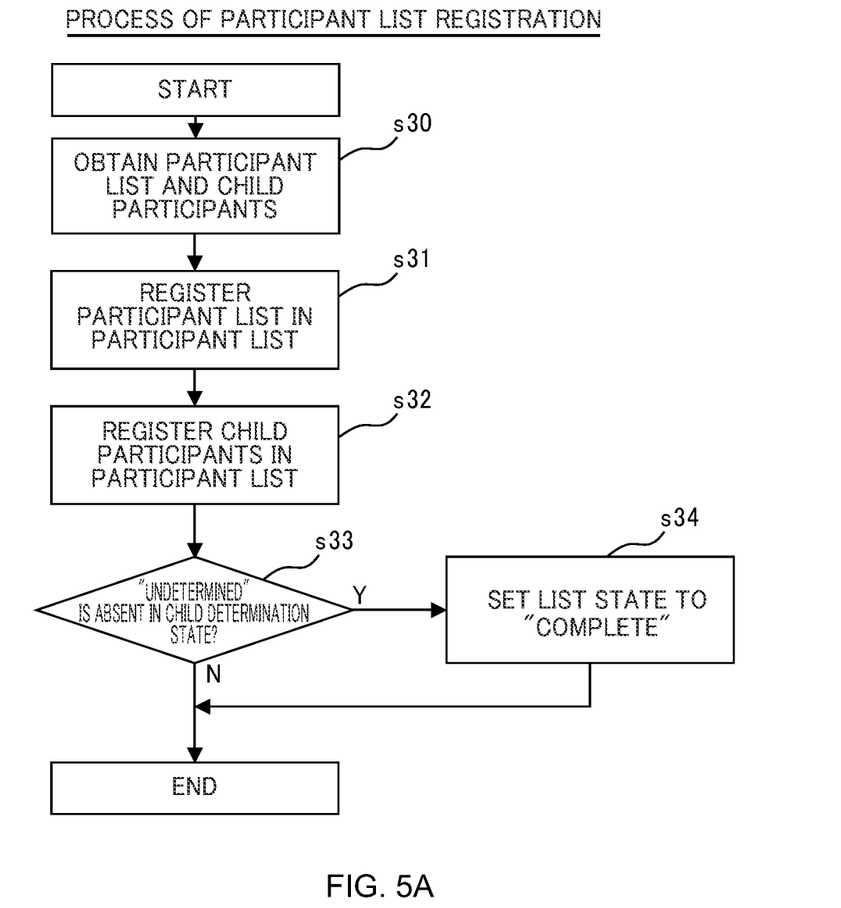
FIG. 5A is a diagram illustrating a processing flow example of participant list registration in the distributed transaction control method of the embodiment.
Figure 5B:
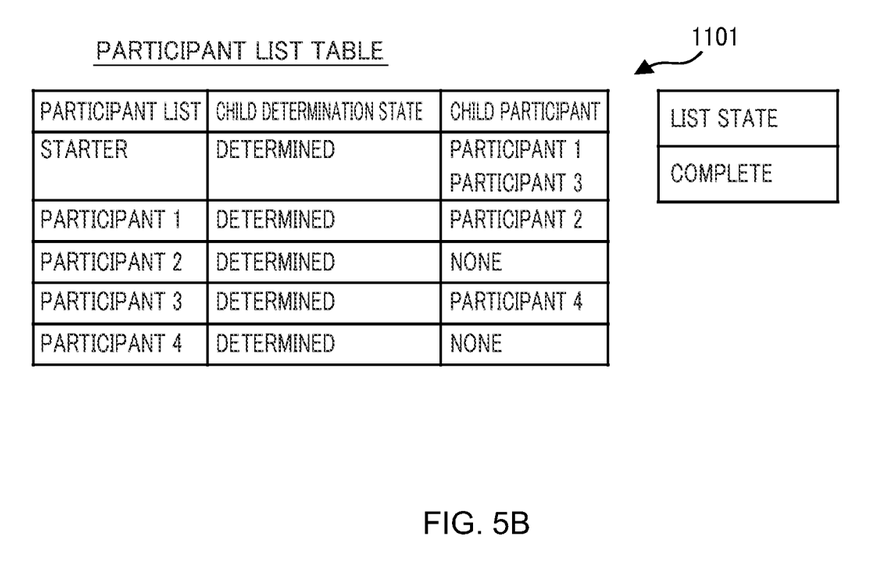
FIG. 5B is a diagram illustrating a configuration example of the participant list table in the embodiment.
Figure 5C:
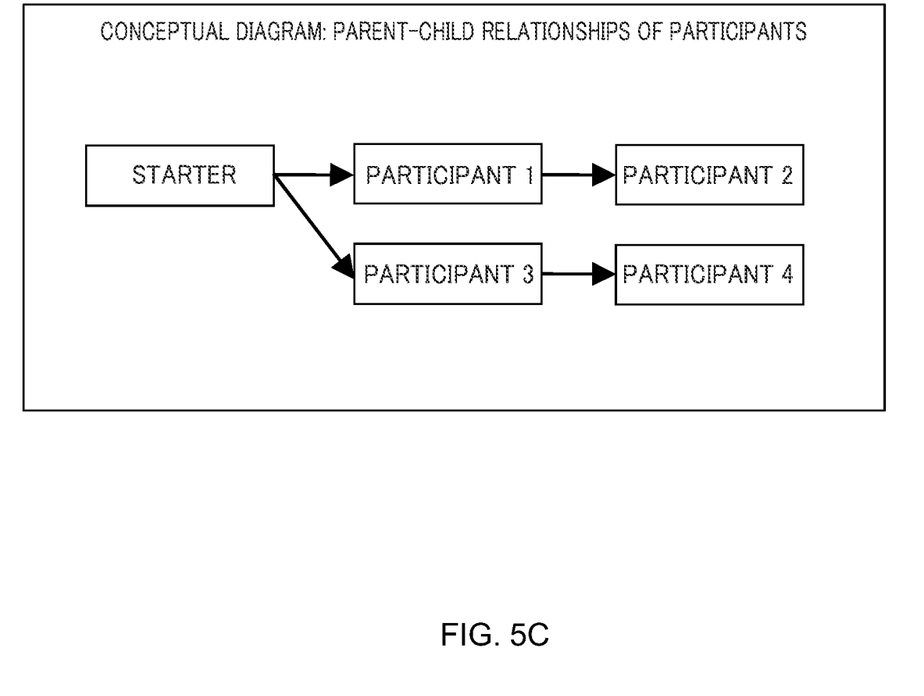
FIG. 5C is a diagram illustrating a parent-child relationship example of participants in the embodiment.

Next, a process flow in the determination part 110 of each coordinator apparatus 100 is described based on FIGS. 5A to 5C. In the case of dynamic application invoking topology, each branch only has partial information of such relationships with nodes above and directly below the branch. Accordingly, the participant list is assumed to be obtained by accumulating the pieces of partial information in the coordinator apparatus 100 and reconstructing the entire topology.

In this case, each of the determination parts 110 obtains the branch information 325 held in advance and pieces of branch information 225 held by the participant apparatuses 200 (s30, s31, s32) and generates the participant list table 1101 (s33, s34). The process of FIG. 5A is a process that replaces the process of s18 in FIG. 4A in the case of dynamic application invoking topology. Moreover, in the case of dynamic application invoking topology, the message reception in s10 of FIG. 4A includes input of fragments of branch information.

Note that, as illustrated in FIG. 5C, relationships between a starter, participants, and child participants assumed to be established herein have a configuration including, with the starter being a starting point, participants 1 and 3 that determine success or failure of preparation upon directly receiving transactions from the starter and participants 2 and 4 that are child participants configured to determine success or failure of preparation for some or all of the transactions upon receiving processing requests from the participants 1 and 3.

Note that, in this case, the participant list management part 310 determines whether there is a participant for which a child participant is not determined, that is whether there is a participant whose "child determination state" field is set to "undetermined" in the participant list table 1101 (s33). When the result of this determination is such that there is no participant whose "child determination state" field is set to "undetermined" (s33: Y), the participant list management part 310 sets the list state to "complete" (s34, see FIG. 5B) and terminates the process.

Figure 6:
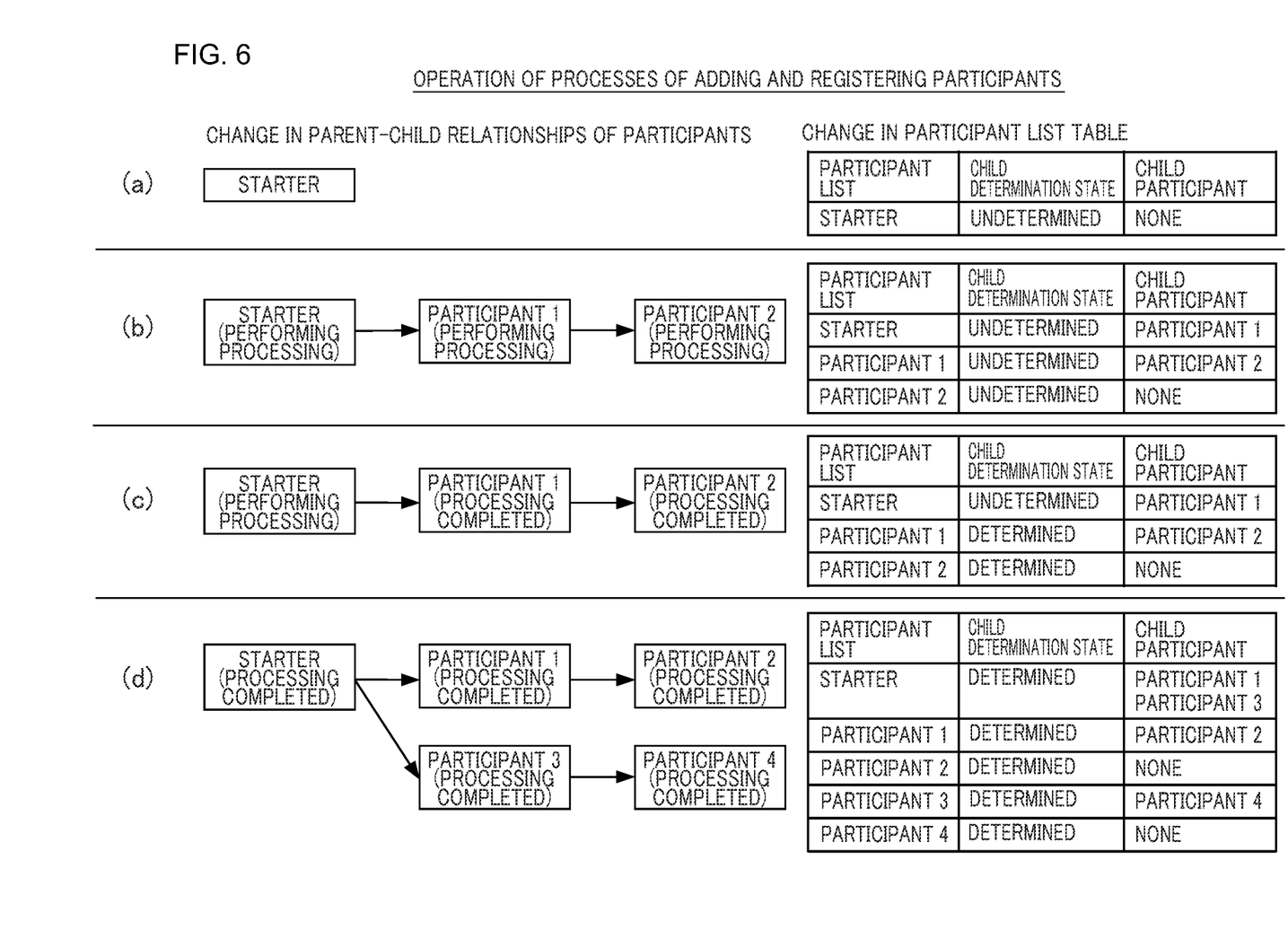
FIG. 6 is a diagram illustrating a processing operation example of addition and registration of participants in the embodiment.

FIG. 6 illustrates an example of a processing operation of adding and registering participants as described above. As illustrated in FIG. 6, a parent-child relationship of each of the participants including the starter changes from state (a) to state (b), to state (c), and then to state (d).

In state (a) among these states, the starter is the only participant and only the information on the starter is registered in the participant list table 1101.

In the state (b), the participant 1 having received a request from the aforementioned starter and the participant 2 having received a request from the participant 1 appear and information on each of the participants including the starter is registered in the participant list table 1101. In this case, the starter and the participants 1 and 2 are all performing processes of transactions.

In state (c), the processes in the participants 1 and 2 from the aforementioned state (b) are completed and only the starter is performing the process. As a matter of course, this state is set in the participant list table 1101.

In the state (d), the participants 3 and 4 are added to a participant configuration in the aforementioned state (c) and the participants are each in a state where a process is completed. As a matter of course, this state is set in the participant list table 1101.

<Flow Example: Transmission of Participant List by Starter Apparatus>

Figure 7:
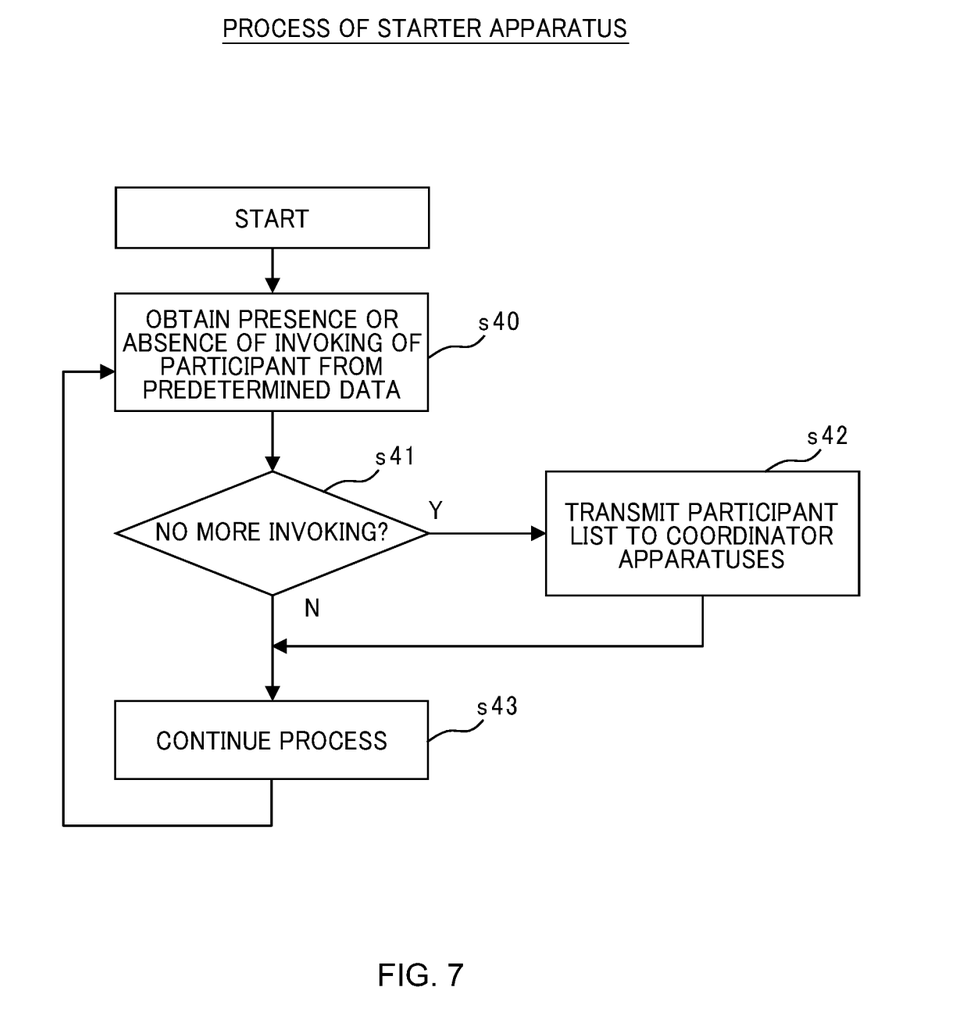
FIG. 7 is a flowchart illustrating a processing example of a starter apparatus in the embodiment.

As described above, the starter apparatus 300 that manages the participant list table eventually transmits the table to the coordinator apparatuses 100 as in a flow illustrated in FIG. 7.

In this case, the participant list management part 310 of the starter apparatus 300 senses presence or absence of invoking of a participant (example: from participant 1 to participant 2, or the like) from, for example, predetermined data such as setting information indicating last invoking of a participant or notification from the participant apparatus 200 (s40), and determines whether there is no more invoking (s41).

When the result of the aforementioned determination is such that there is no more invoking (s41: Y), the starter apparatus 300 transmits the participant list table obtained up to this point to the coordinator apparatuses 100 (s42). As described above, the starter apparatus 300 recognizes the completion of the transaction process at the point where the participant list table is determined, transmits the participant list to the coordinator apparatuses 100, and instructs start of settlement voting.

Meanwhile, when the result of the aforementioned determination is such that there is more invoking (s41: N), the starter apparatus 300 determines to continue the process (s43) and returns the process to s40.

Note that the starter apparatus 300 and the participant apparatuses 200 may each transmit information to the determination part 110 by any method at any timing. The timing may be every time when a starter, a participant, or a parent-child relationship is changed, a timing at which the parent-child relationship is determined, or the like. A transmission method may be a method in which information is directly transmitted to the determination part 110, a method in which information is superimposed on a response message to an invoker that is in the parent-child relationship to be returned to the invoker and the invoker collectively transmits the information to the determination part 110, or the like.

Note that the timing and the method are not limited to those described above and any timing and any method may be used as long as information reaches the determination part 110.

In order to reduce communication time necessary for commit, the starter apparatus 300 transmits the participant list to the coordinator apparatuses 100 at the earliest timing at which the participant list is determined, without waiting for completion of all application invoking operations and return of responses. Since there are various alternative methods of determining the earliest timing, the timing is assumed to be obtained from predetermined information.

<Flow of Participant Apparatus>

Figure 8:
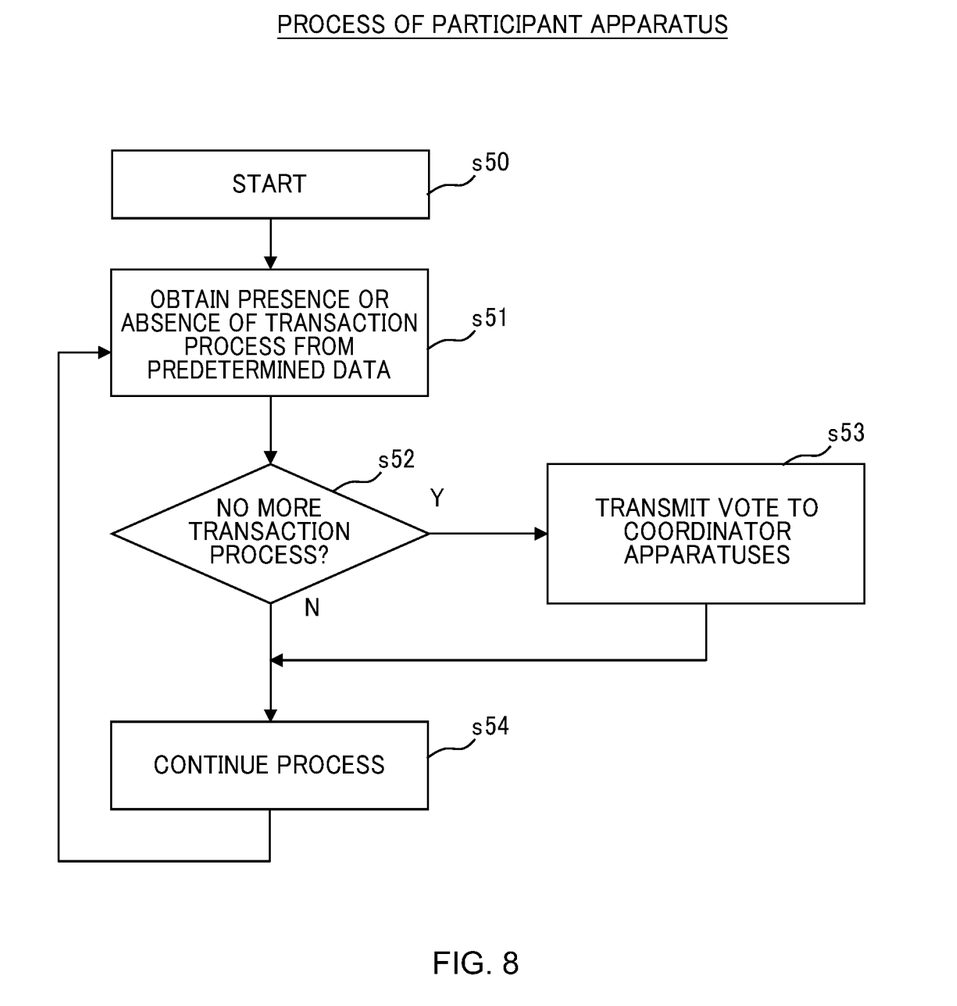
FIG. 8 is a flowchart illustrating a processing example of a participant apparatus in the embodiment.

Next, a flow of voting of success or failure of preparation in each participant apparatus 200 is described based on FIG. 8. In this case, the participant apparatus 200 recognizes the completion of the transaction process as, for example, a timing at which the processes in the respective participants that have process input-output relationship with this participant apparatus are completed (s51 and s52) and transmits a preparation vote to the coordinator apparatus 100 (s53).

Although the best mode for carrying out the present disclosure and the like have been specifically described above, the present disclosure is not limited to this mode and various changes can be made within a scope not departing from the gist of the present disclosure.

According to the present embodiment, the inconsistency and stagnation in business operations caused by two-phase commit can be appropriately suppressed.

According to the description in this specification, at least the following will become clear. That is, with the distributed transaction control system of this embodiment, wherein a starter apparatus of the transaction may include a participant list management part configured to manage a participant list of participants participating in the settlement of the transaction, the participant list management part may transmit the participant list to the determination part in each of the coordinator apparatuses, and when the determination part in each of the coordinator apparatuses performs the determination for the input votes, the determination part may perform the determination based on the participant list completed before time out, assuming that the input votes from all participants are obtained.

According to this configuration, in order to solve the problems of tree-shaped two-phase commit along a topology while supporting dynamic application invoking topology, the commit process does not have a tree shape and the transaction coordinators can perform the commit process while using the participant list as the input information.

With the distributed transaction control system of this embodiment, wherein the participant list management part of the starter apparatus may be a part that obtains branch information held in advance and generates the participant list.

According to this configuration, the starter apparatus that is the invoker uses the branch information held by itself and this resultantly reduces the communication time and overhead for obtaining the participant list.

With the distributed transaction control system of this embodiment, wherein the determination part may be a part that obtains branch information held in advance in the starter apparatus and branch information held by the participant apparatuses and generates the participant list.

In the dynamic application invoking topology, each branch has only the partial information such as relationships with the nodes above and directly below the branch. However, according to this configuration, the participant list can be obtained by aggregating the pieces of partial information in the coordinator apparatuses and reconstructing the entire topology. The communication time for obtaining the participant list in a multi-stage invoking configuration is then reduced.

With the distributed transaction control system of this embodiment, wherein the starter apparatus may be an apparatus that recognizes completion of a transaction process at a point where the participant list is determined, transmits the participant list to the coordinator apparatuses, and gives an instruction to start settlement voting.

According to this configuration, the starter apparatus can provide the participant list to the coordinator apparatuses at the earliest timing at which the participant list is determined, without waiting for the completion of all application invoking operations and the return of responses. Accordingly, the communication time necessary for commit can be reduced.

With the distributed transaction control system of this embodiment, wherein each of the participant apparatuses may be an apparatus that recognizes completion of a transaction process as a timing of completion of a process in each of participants having process input-output relationships with the participant apparatus and performs preparation voting.

According to this configuration, the preparation voting is performed early at the timing at which the processes of the participants are completed. Accordingly, the communication time necessary for commit can be reduced.

With the distributed transaction control system of this embodiment, wherein each of the participant apparatuses may perform abstention voting when the participant apparatus is not involved in a result of a transaction process, and when the input vote from the participant apparatus is the abstention voting, the determination part of each of the coordinator apparatuses may exclude the input vote from the participant apparatus from the determination.

According to this configuration, it is possible to flexibly handle the cases where a participant is not involved in a result of a transaction such as the case where the participant is read only and the case where the participant does not access a database.

With a distributed transaction control method of this embodiment, wherein in a starter apparatus of the transaction, a participant list management part configured to manage a participant list of participants participating in the settlement of the transaction may transmit the participant list to the determination part of each of the coordinator apparatuses, and when the determination part in each of the coordinator apparatuses performs the determination for the input votes, the determination part may perform the determination based on the participant list completed before time out, assuming that the input votes from all participants are obtained.

With the distributed transaction control method of this embodiment, wherein the participant list management part of the starter apparatus may obtain branch information held in advance and generates the participant list.

With the distributed transaction control method of this embodiment, wherein the determination part may obtain branch information held in advance in the starter apparatus and branch information held by the participant apparatuses and may generate the participant list.

With the distributed transaction control method of this embodiment, wherein the starter apparatus may recognize completion of a transaction process at a point where the participant list is determined, may transmit the participant list to the coordinator apparatuses, and may give an instruction to start settlement voting.

With the distributed transaction control method of this embodiment, wherein each of the participant apparatuses may recognize completion of a transaction process as a timing of completion of a process in each of participants having process input-output relationships with the participant apparatus and may perform preparation voting.

With the distributed transaction control method of this embodiment, wherein each of the participant apparatuses may perform abstention voting when the participant apparatus is not involved in a result of a transaction process, and when the input vote from the participant apparatus is the abstention voting, the determination part of each of the coordinator apparatuses may exclude the input vote from the participant apparatus from the determination.

The invention claimed is:

1. A distributed transaction control system comprising redundant coordinator apparatuses that each includes:
   a determination part configured to wait for input votes from participant apparatuses and perform determination in settlement of a transaction;
   a distributed consensus processing part configured to make a decision on a determination result of the determination part; and
   a settlement part configured to decide whether to commit or rollback the transaction based on a result of the decision, wherein
   the determination part replaces the input votes to votes of preparation failure when the input votes time out, makes a determination of commit when all input votes are votes of preparation success, makes a determination of rollback when the input votes include at least one vote of preparation failure, and inputs a content of the determination into the distributed consensus processing part,
   the distributed consensus processing part decides on one of the contents of the determination that are inputs from a plurality of the determination parts, by distributed consensus, and the settlement part notifies an output of the distributed consensus processing part to the participant apparatuses as a settlement result.

2. The distributed transaction control system according to claim 1, wherein a starter apparatus of the transaction includes a participant list management part configured to manage a participant list of participants participating in the settlement of the transaction, the participant list management part transmits the participant list to the determination part in each of the coordinator apparatuses, and when the determination part in each of the coordinator apparatuses performs the determination for the input votes, the determination part performs the determination based on the participant list completed before time out, assuming that the input votes from all participants are obtained.

3. The distributed transaction control system according to claim 2, wherein the participant list management part of the starter apparatus is a part that obtains branch information held in advance and generates the participant list.

4. The distributed transaction control system according to claim 2, wherein the determination part is a part that obtains branch information held in advance in the starter apparatus and branch information held by the participant apparatuses and generates the participant list.

5. The distributed transaction control system according to claim 2, wherein the starter apparatus is an apparatus that recognizes completion of a transaction process at a point where the participant list is determined, transmits the participant list to the coordinator apparatuses, and gives an instruction to start settlement voting.

6. The distributed transaction control system according to claim 1, wherein each of the participant apparatuses is an apparatus that recognizes completion of a transaction process as a timing of completion of a process in each of participants having process input-output relationships with the participant apparatus and performs preparation voting.

7. The distributed transaction control system according to claim 1, wherein each of the participant apparatuses performs abstention voting when the participant apparatus is not involved in a result of a transaction process, and when the input vote from the participant apparatus is the abstention voting, the determination part of each of the coordinator apparatuses excludes the input vote from the participant apparatus from the determination.

8. A distributed transaction control method implemented by a system including redundant coordinator apparatuses that each includes a determination part configured to wait for input votes from participant apparatuses and perform determination in settlement of a transaction, a distributed consensus processing part configured to make a decision on a determination result of the determination part, and a settlement part configured to decide whether to commit or rollback the transaction based on a result of the decision, the method comprising: in each of the coordinator apparatuses, replacing the input votes to votes of preparation failure with the determination part when the input votes time out, making a determination of commit when all input votes are votes of preparation success, making a determination of rollback when at least one of the input votes is the vote of preparation failure, and inputting a content of the determination into the distributed consensus processing part;

deciding with the distributed consensus processing part on one of the contents of the determination that are inputs from a plurality of the determination parts, by distributed consensus; and notifying with the settlement part the output of the distributed consensus processing part to the participant apparatuses as a settlement result.

9. The distributed transaction control method according to claim 8, wherein in a starter apparatus of the transaction, a participant list management part configured to manage a participant list of participants participating in the settlement of the transaction transmits the participant list to the determination part of each of the coordinator apparatuses, and when the determination part in each of the coordinator apparatuses performs the determination for the input votes, the determination part performs the determination based on the participant list completed before time out, assuming that the input votes from all participants are obtained.

10. The distributed transaction control method according to claim 9, wherein the participant list management part of the starter apparatus obtains branch information held in advance and generates the participant list.

11. The distributed transaction control method according to claim 9, wherein the determination part obtains branch information held in advance in the starter apparatus and branch information held by the participant apparatuses and generates the participant list.

12. The distributed transaction control method according to claim 9, wherein the starter apparatus recognizes completion of a transaction process at a point where the participant list is determined, transmits the participant list to the coordinator apparatuses, and gives an instruction to start settlement voting.

13. The distributed transaction control method according to claim 8, wherein each of the participant apparatuses recognizes completion of a transaction process as a timing of completion of a process in each of participants having process input-output relationships with the participant apparatus and performs preparation voting.

14. The distributed transaction control method according to claim 8, wherein each of the participant apparatuses performs abstention voting when the participant apparatus is not involved in a result of a transaction process, and when the input vote from the participant apparatus is the abstention voting, the determination part of each of the coordinator apparatuses excludes the input vote from the participant apparatus from the determination.

* * * * *